(12) United States Patent
Wu et al.

(10) Patent No.: US 6,584,868 B2
(45) Date of Patent: Jul. 1, 2003

(54) SLIDE TRACK STRUCTURE OF A LINEAR PLATFORM

(75) Inventors: Ching-Shan Wu, Taichung (TW); Chau-Chang Chou, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 09/860,690

(22) Filed: May 21, 2001

(65) Prior Publication Data

US 2002/0172437 A1 Nov. 21, 2002

(51) Int. Cl.$^7$ ............................................. F16C 29/06
(52) U.S. Cl. .................................. 74/89.32; 384/45
(58) Field of Search ........................ 384/45, 44, 43; 74/89.32

(56) References Cited

U.S. PATENT DOCUMENTS 4,582,371 A * 4/1986 Mottate ........................ 384/45
5,388,914 A * 2/1995 Takei ........................... 384/45

* cited by examiner

*Primary Examiner*—Lenard A. Footland

(57) ABSTRACT

The present invention is to provide a slide track structure of a linear platform, wherein the center of gravity of the slide track structure of the linear platform may be lowered. In addition, the outer edge of the upper end of the U-shaped guide track is formed with an inclined face or a smooth arc-shaped face, thereby capable of producing better structural stiffness, saving material, and decreasing weight. Thus, the slide track structure of the linear platform of the present invention can increase the structural stiffness, save material, and decrease the entire weight.

5 Claims, 6 Drawing Sheets

SLIDE TRACK STRUCTURE OF A LINEAR PLATFORM

BACKGROUND OF THE INVENTION

1. Field of the Invention

The present invention relates to the improvement of a slide track structure of a linear platform, and more particularly to a slide track structure of a linear platform, wherein each upper end of the U-shaped guide track is formed with an inclined face, thereby capable of producing better structural stiffness, saving material, and decreasing the entire weight.

2. Description of the Related Art

A conventional linear platform includes a base, guide tracks, a slide base, a transmission mechanism, and a motor. The opposite parallel guide tracks are secured on the base. The transmission mechanism mounted on the slide base will transform the cycling action into the linear movement of the slide base, so as to drive the slide base to displace and move on the guide track. Usually, the transmission mechanism includes a ball screw or a belt.

A conventional guide track 7 in accordance with the prior art shown in FIG. 1 is formed with guide grooves 71 co-operating with the transmission mechanism on the slide base, and has a U-shaped structure. The U-shaped structure has a good structural inertia moment for resisting a bending action, thereby providing better stiffness. The elongated guide grooves 71 at the two sides of the guide track 7 are provided with balls that may roll, so that the slide base may be driven by the transmission mechanism to move linearly by means of rolling of the balls. The guide track 7 is stationary, and the slide base is moved linearly relative to the guide track 7. However, the conventional linear platform has the following disadvantages.

1. The linear platform needs to be fed at a high velocity, needs to be positioned precisely, and needs to be controlled easily, so that the structural stiffness of the original guide track 7 is not enough.
2. The mass of the linear platform will produce an inertia force of action, and the longer solid structure of the conventional guide track 7 is the primary factor of producing the inertia force of action, thereby causing worse influence on the precision of the product, especially for the multi-layer or multi-axle type combination (such as the X-Y axis type platform), or for the cycling and cantilever beam type linear driving platform. Therefore, the most important problem is to decrease the structural inertia action.
3. The lifetime of the linear platform depends on co-operation of the guide track 7 and the transmission mechanism of the slide base. If the dust, dirt or the like infiltrate into the guide track 7 and the transmission mechanism of the slide base, the precision of transmission is affected, and the lifetime is decreased.
4. The center of gravity "G" of the conventional linear platform is higher, thereby easily affecting the stability during operation at a high velocity, wasting material of the guide track 7, and increasing the weight of the guide track 7.

For solving the shortcomings of the conventional linear platform, the structural thickness may be increased to increase the stiffness. However, the structural weight is increased in the meantime.

SUMMARY OF THE INVENTION

The primary objective of the present invention is to provide a slide track structure of a linear platform that may increase the structural stiffness. The center of gravity of the slide track structure of the linear platform may be lowered. The outer edge of the upper end of the U-shaped guide track is formed with an inclined face or a smooth arc-shaped face, thereby capable of producing better structural stiffness.

Another objective of the present invention is to provide a slide track structure of a linear platform that may save cost of material. The outer edge of the upper end of the U-shaped guide track is formed with an inclined face. Thus, lowering of the center of gravity may reduce the height of the U-shaped guide track, while the inclined face may reduce the thickness of the U-shaped guide track, thereby saving cost of material.

A further objective of the present invention is to provide a slide track structure of a linear platform that may reduce the entire weight. The lowering of the center of gravity may reduce the height of the U-shaped guide track, while the inclined face may reduce the thickness of the U-shaped guide track, so that the weight of the U-shaped guide track may be greatly reduced.

A further objective of the present invention is to provide a slide track structure of a linear platform that have a longer lifetime. The peripheral side of the slide base is provided with dustproof plates and oil scraping plates, for covering the clearance between the slide base and the U-shaped guide track, thereby increasing the lifetime of the present invention.

Further benefits and advantages of the present invention will become apparent after a careful reading of the detailed description with appropriate reference to the accompanying drawings.

DETAILED DESCRIPTION OF THE INVENTION

Figure 1:
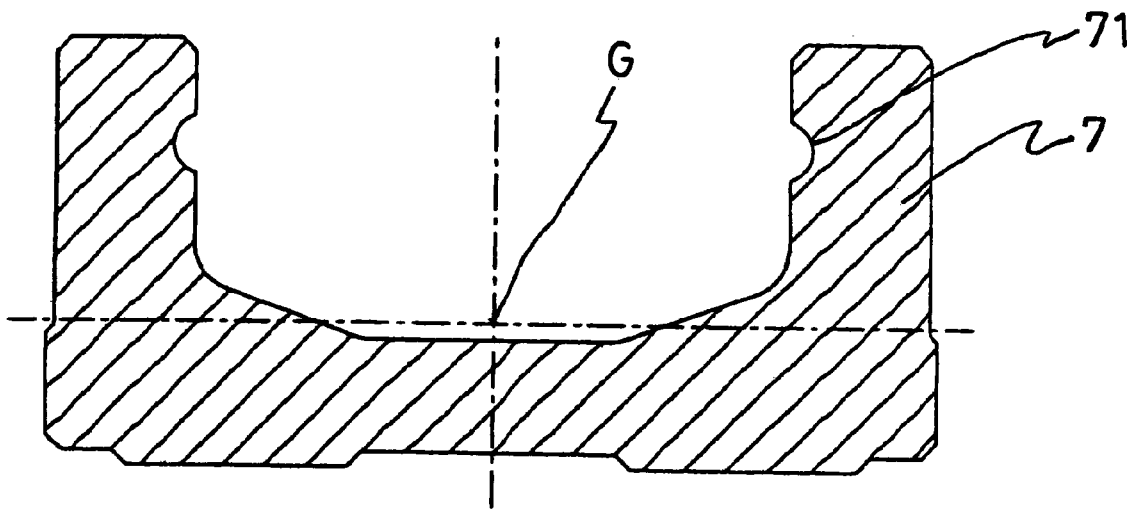
FIG. 1 is a cross-sectional view of a conventional guide track of a linear platform in accordance with the prior art.
Figure 2:
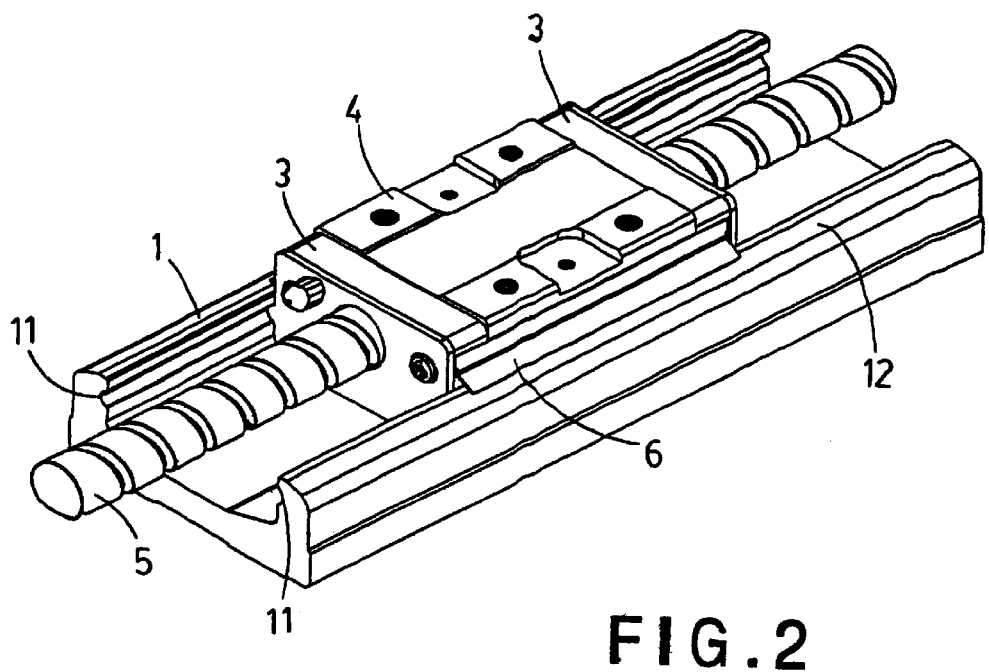
FIG. 2 is a perspective view of a slide track structure of a linear platform in accordance with a first embodiment of the present invention.
Figure 3:
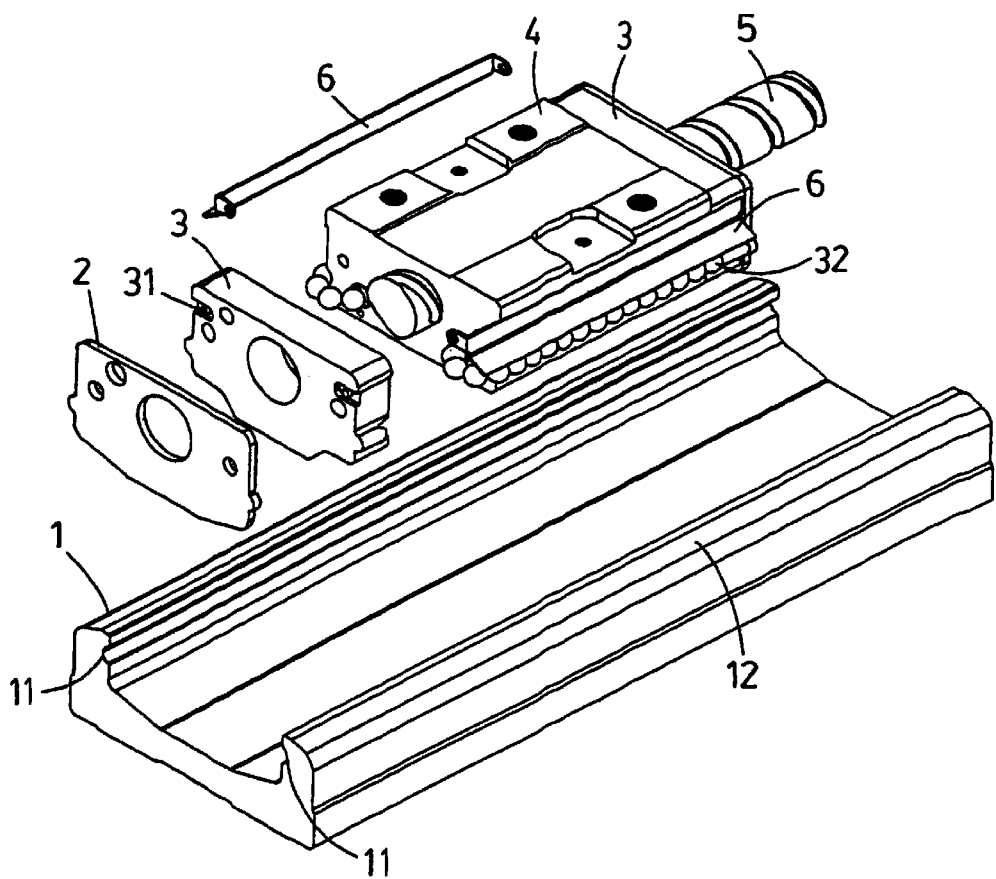
FIG. 3 is an exploded perspective view of the slide track structure of a linear platform as shown in FIG. 2.
Figure 4:
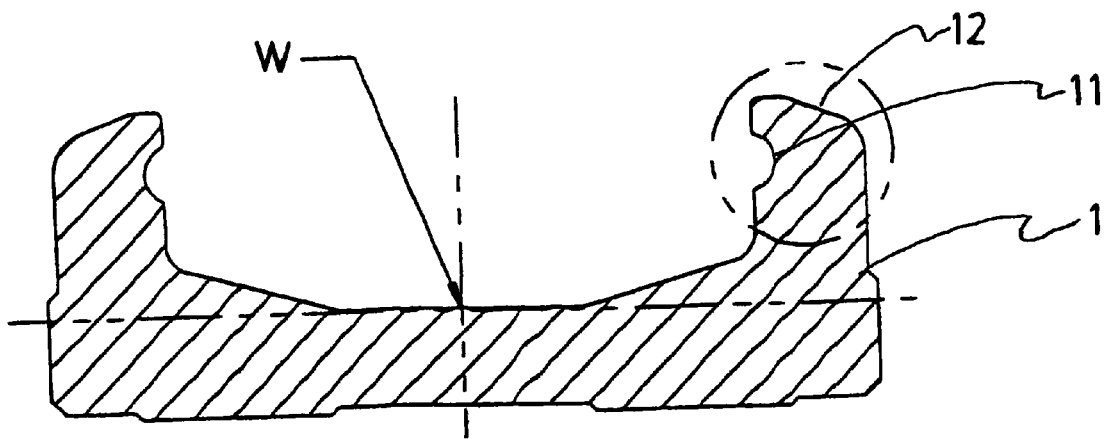
FIG. 4 is a cross-sectional view of a guide track of the slide track structure of a linear platform as shown in FIG. 2.

Referring to the drawings and initially to FIGS. 2–4, a slide track structure of a linear platform in accordance with a first embodiment of the present invention comprises a U-shaped guide track 1, a slide base 4, and a ball screw 5. The two ends of the slide base 4 are provided with end caps 3. The U-shaped guide track 1 has two opposite inner sides provided with elongated grooves 11, so that the slide base 4 may slide in the elongated grooves 11. A plurality of balls 32 that may roll are provided in the elongated grooves 11 of the two sides of the U-shaped guide track 1. The slide base 4 may displace in the U-shaped guide track 1 freely and linearly by means of rolling of the balls 32. The transmission mechanism, namely, the ball screw 5, mounted on the slide base 4 may transform the cycling action driven by the motor into the linear movement of the slide base 4, so as to drive the slide base 4 to displace and slide on the U-shaped guide track 1. The character of the present invention is described as follows.

The outer edges of the two side ends of the U-shaped guide track 1 are formed with an inclined face 12 inclined downward. The inclined face 12 starts from a vertical position "P" opposite to the bottom end of the elongated groove 11, and has an inclined angle "θ" which is smaller than 30 degrees. In addition, the inner edge of each of the two side ends of the U-shaped guide track 1 has a length "K" which is limited between one time and two times of the radius "R" of the ball 32.

The two sides of the end cap 3 of the slide base 4 are each formed with a recessed dustproof plate fixing portion 31 for securing a dustproof plate 6 which is aligned with the elongated groove 11 of the U-shaped guide track 1, and which is rested on the inclined face 12 of the U-shaped guide track 1, for covering the clearance between the slide base 4 and the U-shaped guide track 1. The end cap 31 is provided with an oil scraping plate 2 that is received in the U-shaped guide track 1.

Figure 5:
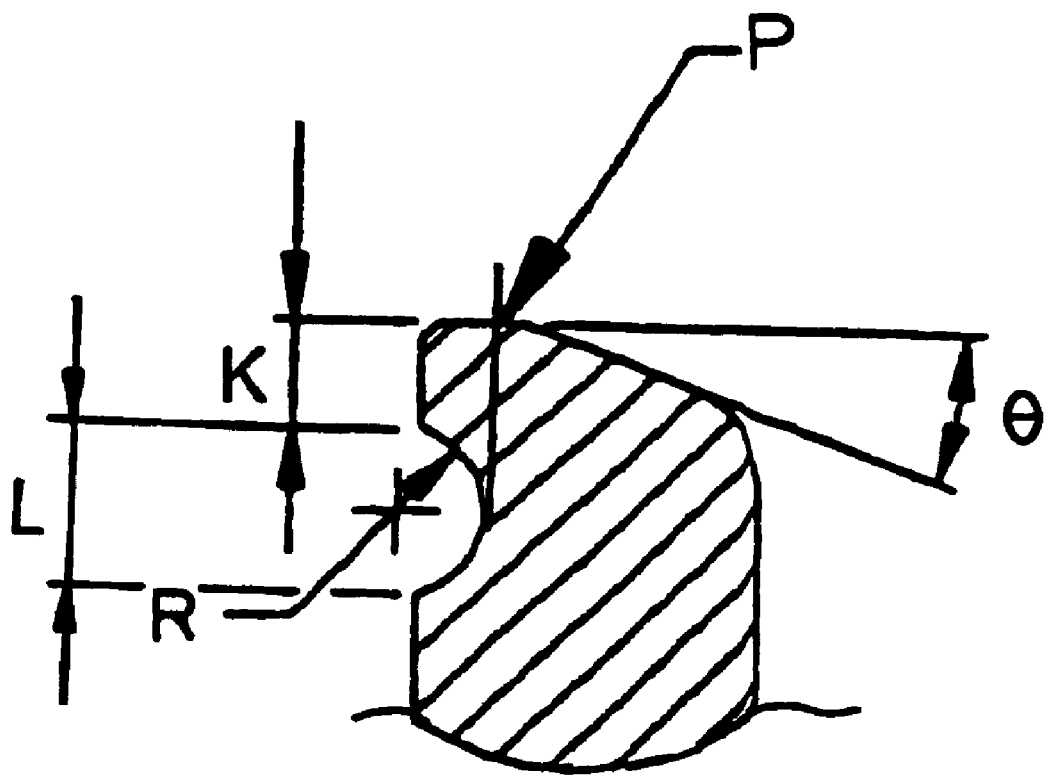
FIG. 5 is a partially enlarged view of the guide track of the slide track structure of a linear platform as shown in FIG. 4.

Referring to FIGS. 4 and 5, the inner edge of the top end of each of the two side of the U-shaped guide track 1 has a length "K" which is limited between one time and two times of the radius "R" of the ball 32, and the position of the elongated groove 11 of the U-shaped guide track 1 is lowered, so that the center of gravity "W" of the U-shaped guide track 1 of the linear platform is lowered, thereby increasing the structural stiffness and saving material. In addition, the length "K" is smaller than the width "L" of each of the elongated grooves 11 (K<L). In addition, the outer edge of the upper end of the U-shaped guide track 1 is formed with an inclined face 12 and a smooth arc face, thereby saving more material, and the center of gravity "W" is further lowered, so that the center of gravity "W" is located on the U-shaped guide track 1. Accordingly, the structure of the present invention may produce better structural stiffness, and may save material.

Figure 7:
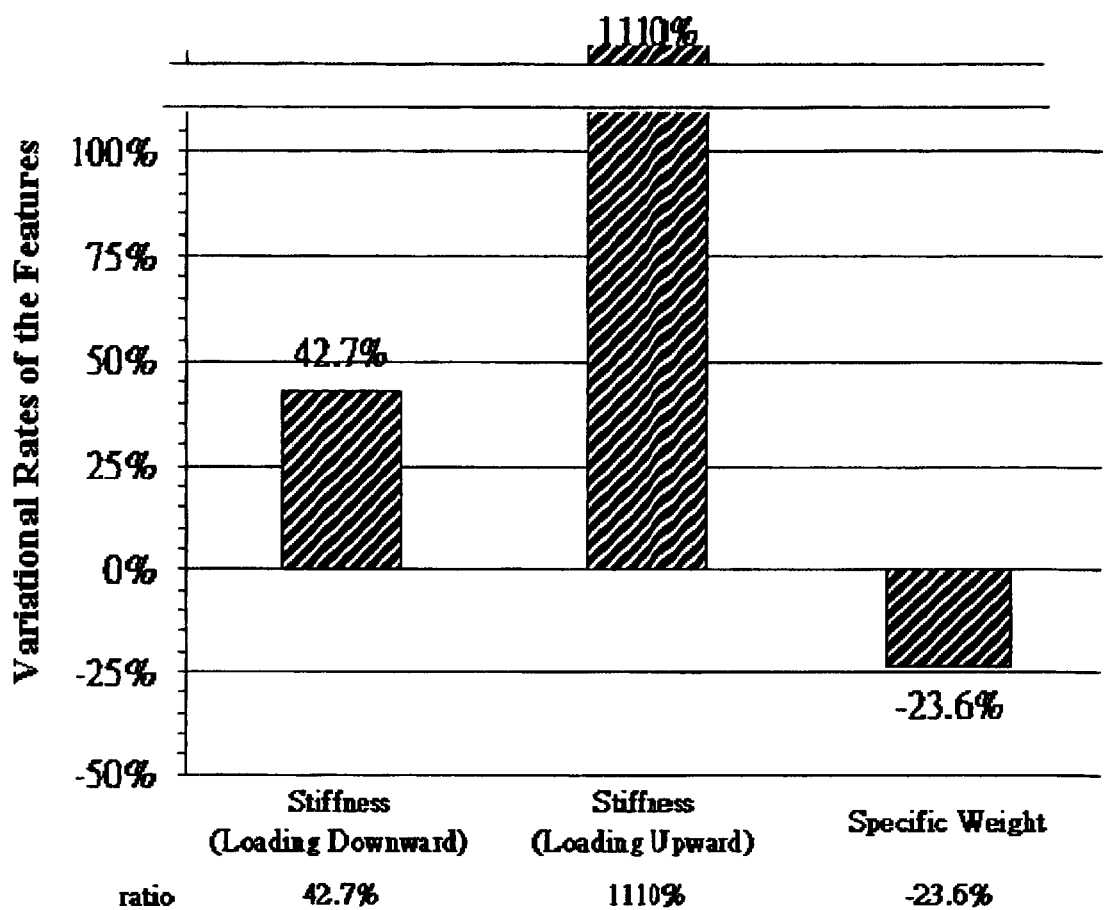
FIG. 7 is a bar chart showing the rate of the feature variation between the design of the present invention and the conventional design.

Referring to FIG. 7, a bar chart is used to show the rate of the feature variation between the design of the present invention and the conventional design. The design of the present invention is a structural design that is accomplished by the finite element method according to the principle of topology optimization. Thus, the lowering of the center of gravity "W" may reduce the structural height of the U-shaped guide track 1, thereby decreasing the cost of material and weight. Especially, the inclined face 12 may greatly reduce the thickness of the U-shaped guide track 1, thereby decreasing the cost of material and weight. As shown in FIG. 7, the results of analysis of the finite element method indicates that, in the present invention, the pressing stiffness is increased by 42.7%, the weight of each unit length is decreased by 23.6%, and the pulling stiffness is increased by 1110%. (The stiffness indicated here is derived from the position of the rolling ball's center.) Thus, not only the material is reduced, but also the mechanical stiffness is increased simultaneously.

It is to be noted that, each of the two sides of the end cap 3 is secured with a dustproof plate 6 which is aligned with the elongated groove 11 of the U-shaped guide track 1, and which is rested on the inclined face 12 of the U-shaped guide track 1, for covering the clearance between the slide base 4 and the U-shaped guide track 1, while the end cap 31 is provided with an oil scraping plate 2 received in the U-shaped guide track 1, thereby preventing dust, dirt or the like from entering the clearance between the slide base 4 and the U-shaped guide track 1, and thereby assuring the normal operation of the elongated groove 11 of the U-shaped guide track 1, the rolling balls 32, and the slide base 4, so as to increase the lifetime of the present invention.

The inclined face 12 of the U-shaped guide track 1 may also be fabricated with an arc-shaped face, thereby increasing the structural stiffness, saving material, and decreasing the entire weight.

Figure 6:
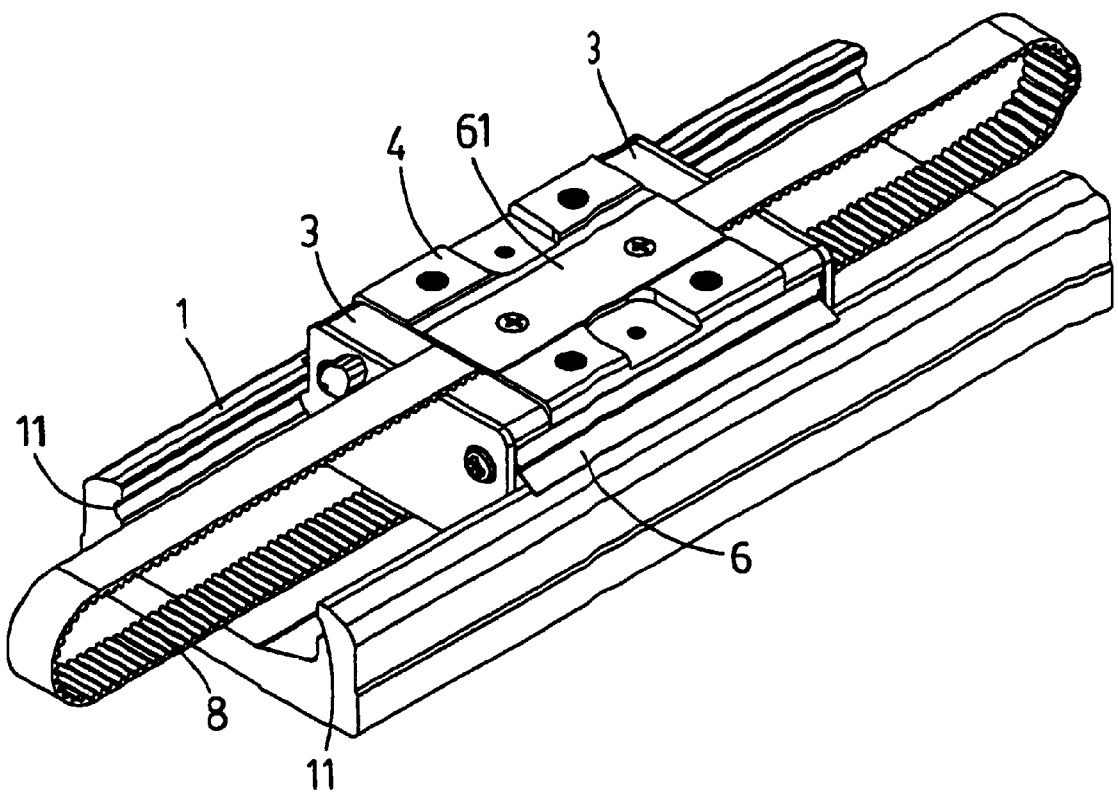
FIG. 6 is a perspective view of a slide track structure of a linear platform in accordance with a second embodiment of the present invention.

Referring now to FIG. 6, in accordance with a second embodiment of the present invention, the transmission mechanism on the slide 4 may include a press plate 61 which co-operates with a belt 8, so as to transform the cycling action driven by the motor into the linear movement of the slide base 4.

In conclusion, in accordance with the present invention, the center of gravity of the slide track structure of the linear platform is lowered. In addition, the outer edge of the upper end of the U-shaped guide track is formed with an inclined face and a smooth arc-shaped face, thereby producing better structural stiffness, saving material, and decreasing weight. Therefore, the slide track structure of the linear platform of the present invention can increase the structural stiffness, save material, and decrease the entire weight.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A slide track structure of a linear platform, comprising a U-shaped guide track co-operating with a slide base, said U-shaped guide track having two opposite side faces provided with elongated grooves, so that said slide base may slide in said elongated grooves, said elongated grooves at two opposite side faces of said U-shaped guide track being provided with a plurality of balls;

wherein, the inner edge of a top end of each of two sides of said U-shaped guide track has a length which is limited between one time and two times of a radius of said ball; and said length is shorter than a width of each of said elongated grooves.

2. The slide track structure of a linear platform in accordance with claim 1, wherein said U-shaped guide track has a center of gravity located on said U-shaped guide track.

3. The slide track structure of a linear platform in accordance with claim 1, wherein an outer edge of each of two side ends of said U-shaped guide track is formed with an inclined face inclined downward, said inclined face starts from a vertical position opposite to a bottom end of said elongated groove, and has an inclined angle which is smaller than 30 degrees.

4. The slide track structure of a linear platform in accordance with claim 3, wherein said inclined face of said U-shaped guide track may be an arc-shaped face.

5. The slide track structure of a linear platform in accordance with claim 1, wherein said slide base is provided with a dustproof plate aligned with said inclined face of said U-shaped guide track, for covering a clearance between said slide base and said U-shaped guide track.

\* \* \* \* \*